US012629765B2

(12) United States Patent
Benzing et al.

(10) Patent No.: US 12,629,765 B2
(45) Date of Patent: May 19, 2026

(54) SHEAR STUD FEEDER FOR A STUD WELDING GUN

(71) Applicant: Structural Services, Inc., Bethlehem, PA (US)

(72) Inventors: James T. Benzing, Bethlehem, PA (US); Jacob Bruce Patterson, Freemansburg, PA (US); William R. Haller, Bethlehem, PA (US)

(73) Assignee: Structural Services, Inc., Bethlehem, PA (US)

( * ) Notice: Subject to any disclaimer, the term of this patent is extended or adjusted under 35 U.S.C. 154(b) by 1045 days.

(21) Appl. No.: 17/716,713

(22) Filed: Apr. 8, 2022

(65) Prior Publication Data

US 2022/0324050 A1      Oct. 13, 2022

Related U.S. Application Data

(60) Provisional application No. 63/172,358, filed on Apr. 8, 2021.

(51) Int. Cl.
  B23K 9/20          (2006.01)
(52) U.S. Cl.
  CPC .............. B23K 9/202 (2013.01); B23K 9/206 (2013.01)

(58) Field of Classification Search
  CPC ................................ B23K 9/202; B23K 9/206
  See application file for complete search history.

(56) References Cited

U.S. PATENT DOCUMENTS

| | | | | |
|---|---|---|---|---|
| 5,130,510 | A * | 7/1992 | Zeigler ..................... | B23K 9/20 |
| | | | | 219/98 |
| 8,764,115 | B2 * | 7/2014 | Brandtner .............. | B68G 13/00 |
| | | | | 297/452.59 |
| 9,630,206 | B2 * | 4/2017 | Nesbitt .................... | B05D 1/06 |
| 9,630,270 | B2 * | 4/2017 | Martin ................... | B23K 9/206 |
| 9,764,411 | B2 * | 9/2017 | Benzing ................... | B23K 9/20 |

* cited by examiner

*Primary Examiner* — Elizabeth M Kerr
*Assistant Examiner* — Keith Brian Assante
(74) *Attorney, Agent, or Firm* — Saxton & Stump LLC

(57) ABSTRACT

A shear stud feeder for a stud welding gun may include a support frame having a first slide rail and a second slide rail longitudinally spaced apart from the first slide rail to form a slot therebetween. The shear stud feeder may also include a magazine removably engaged with the support frame. The magazine may be adapted to support a plurality of shear studs by the head of each shear stud in a manner in which the body of each shear stud hangs below a bottom of the magazine and wherein the magazine is adapted to dispense the plurality of shear studs to the slot. The shear stud feeder may include a feed mechanism disposed adjacent to either the first slide rail or the second slide rail and a gate assembly adjacent to a front end of each of the first slide rail and the second slide rail.

17 Claims, 13 Drawing Sheets

SHEAR STUD FEEDER FOR A STUD WELDING GUN

CROSS REFERENCE TO RELATED APPLICATIONS

This application claims the benefit of U.S. Provisional Application No. 63/172,358, having a filing date of Apr. 8, 2021, which is incorporated by reference as if fully set forth.

BACKGROUND

Certain modern construction applications require composite beams. A composite beam is typically a hot rolled steel beam that acts compositely with a concrete slab. In order to transfer force between the steel beam and the concrete slab, shear studs are welded to the steel and then, concrete is poured over the beam, e.g., over a deck installed over the beam. The concrete hardens around the shear studs and engages the shear studs in a manner which allows the composite beam to become stiffer and more resistant to bending. This type of construction allows for longer spans and shallower floors when compared to non-composite building methods.

Typically, the shear studs are manually welded onto a steel beam using a drawn arc stud welding process. In the drawn arc stud welding process, ceramic ferrules are placed at predetermined locations along the steel beam. One at a time, a shear stud is placed on the steel beam with the tip of the shear stud inside the ferrule. An electrical arc is transmitted from the stud welding gun through the shear stud and creates a pool of molten metal inside the ferrule from the tip of the shear stud. The ferrule keeps the molten metal therein and allows the end of the shear stud to be welded, or fused, to the surface of the steel beam. The process of welding shear studs is a very time consuming and arduous process and any improvements are welcome in the industry. For example, during the stud welding process, the operator of the stud welding gun must constantly manually load shear studs into the collet of the stud welding gun.

Accordingly, there is a need for a shear stud feeder for a stud welding gun that is able to quickly and efficiently deliver shear studs to the stud welding gun.

SUMMARY

Several specific aspects of the systems and methods of the subject matter disclosed herein are outlined below.

Aspect 1. An apparatus comprising:

a support frame having a first slide rail and a second slide rail longitudinally spaced apart from the first slide rail to form a slot therebetween along the entire length of each slide rail;

a magazine removably engaged with the support frame, wherein the magazine is adapted to support a plurality of shear studs by the head of each stud in a manner in which the body of each stud hangs below a bottom of the magazine and wherein the magazine is adapted to dispense the plurality of shear studs to the slot between the slide rails;

a feed mechanism disposed adjacent to either the first slide rail or the second slide rail, wherein the feed mechanism is adapted to release the plurality of shear studs from the magazine one at a time; and a gate assembly adjacent to a front end of each of the first slide rail and the second slide rail, wherein the gate assembly is adapted to capture a shear stud after it is released from the magazine by the feed mechanism.

Aspect 2. The apparatus of Aspect 1, wherein the gate assembly is adapted to release the shear stud upon application of a downward force to a portion of the gate assembly.

Aspect 3. The apparatus of Aspect 2, wherein the gate assembly includes at least one gate that is movable between a closed position in which the shear stud is retained in the gate assembly and an open position in which the shear stud is release from the gate assembly.

Aspect 4. The apparatus of Aspect 3, wherein the at least one gate rotates from the closed position to the open position.

Aspect 5. The apparatus of Aspect 1, wherein each slide rail includes a layer of polymer disposed thereon.

Aspect 6. The apparatus of Aspect 5, wherein the polymer comprises polytetrafluoroethylene (PTFE), polyoxymethylene (POM), ultra-high molecular weight polyethylene (UHMVV), high-density polyethylene (HDPE), or a combination thereof.

Aspect 7. The apparatus of Aspect 1, wherein the slide rails are parallel to each other and each slide rail forms an angle with respect to a horizontal axis and the angle is greater than or equal to 10°, such as greater than or equal to 15°, greater than or equal to 20°, greater than or equal to 25°, or greater than or equal to 30°.

Aspect 8. The apparatus of Aspect 7, wherein the angle is less than or equal to 45°, such as less than or equal to 40°, or less than or equal to 35°.

Aspect 9. An apparatus comprising:

a support frame having a first slide rail and a second slide rail longitudinally spaced apart from the first slide rail to form a slot therebetween along the entire length of each slide rail, wherein the slot is adapted to receive a plurality of shear studs hanging within the slot; and a feed mechanism disposed adjacent to either the first slide rail or the second slide rail, wherein the feed mechanism is adapted to release the plurality of shear studs from the slot one at a time.

Aspect 10. The apparatus of Aspect 9, wherein the feed mechanism includes a trigger wheel disposed on a shaft.

Aspect 11. The apparatus of Aspect 10, wherein the feed mechanism further includes a stud sprocket disposed on the shaft and as the trigger wheel rotates, the stud sprocket rotates.

Aspect 12. The apparatus of Aspect 11, wherein the stud sprocket includes a plurality of sprocket teeth around the outer periphery of the stud sprocket.

Aspect 13. The apparatus of Aspect 12, wherein the stud sprocket is adapted to receive each of the shear studs one at a time between adjacent sprocket teeth of the stud sprocket as the stud sprocket rotates.

Aspect 14. The apparatus of Aspect 9, further comprising a gate assembly adjacent to a front end of each of the first slide rail and the second slide rail, wherein the gate assembly captures a shear stud after it is released the feed mechanism.

Aspect 15. The apparatus of Aspect 9, further comprising a magazine removably engaged with the support frame, wherein the magazine supports a plurality of shear studs by the head of each stud in a manner in which the body of each stud hangs below a bottom of the magazine and wherein the magazine dispenses the plurality of shear studs to the slot between the slide rails.

Aspect 16. An apparatus comprising:

a support frame having a first slide rail and a second slide rail longitudinally spaced apart from the first slide rail to form a slot therebetween along the entire length of each slide rail, wherein the slot is adapted to receive a plurality of shear studs hanging within the slot; and

a gate assembly adjacent to a front end of each of the first slide rail and the second slide rail, wherein the gate assembly is adapted to capture a shear stud after it is released from the slot between the slide rails.

Aspect 17. The apparatus of Aspect 16, wherein the gate assembly includes a pair of opposing gate sub-assemblies and each gate sub-assembly comprises at least one guide block and a vertical gate shaft movably disposed within the guide block.

Aspect 18. The apparatus of Aspect 17, wherein each gate sub-assembly further includes a landing plate disposed at a top of the vertical gate shaft.

Aspect 19. The apparatus of Aspect 18, wherein each gate sub-assembly further includes a horizontal gate shaft extending through the landing plate.

Aspect 20. The apparatus of Aspect 19, wherein each gate sub-assembly further includes a gate mounted on an end of the horizontal gate shaft.

Aspect 21. The apparatus of Aspect 20, wherein each gate is rotatable between a close position and an open position.

Aspect 22. The apparatus of Aspect 21, wherein in the closed position a shear stud is held in place within the gate assembly.

Aspect 23. The apparatus of Aspect 22, wherein in the open position a shear stud may be retrieved from the gate assembly.

Aspect 24. The apparatus of Aspect 18, wherein the landing plate may further include a polymer layer disposed thereon.

Aspect 25. The apparatus of Aspect 24, wherein the polymer includes polytetrafluoroethylene (PTFE), poly-oxymethylene (POM), ultra-high molecular weight polyethylene (UHMVV), or a combination thereof.

Aspect 26. The apparatus of Aspect 18, wherein the landing plate is slightly angled downward from the front to back, so an upper surface of the landing plate an angle with respect to a horizontal axis.

Aspect 27. The apparatus of Aspect 26, wherein the angle is be greater than or equal to 0.50°, such as greater than or equal to 0.10°, greater than or equal to 0.15°, greater than or equal to 0.20°, greater than or equal to 0.25°, or greater than or equal to 0.30°.

Aspect 28. The apparatus of Aspect 27, wherein the angle is less than or equal to 5.00°, such as less than or equal to 4.00°, less than or equal to 3.00°, less than or equal to 2.00°, or less than or equal to 1.00°.

BRIEF DESCRIPTION OF THE DRAWINGS

For a more complete understanding of the present invention, reference is made to the following detailed description of embodiments considered in conjunction with the accompanying drawings, in which.

4

Figure 8:
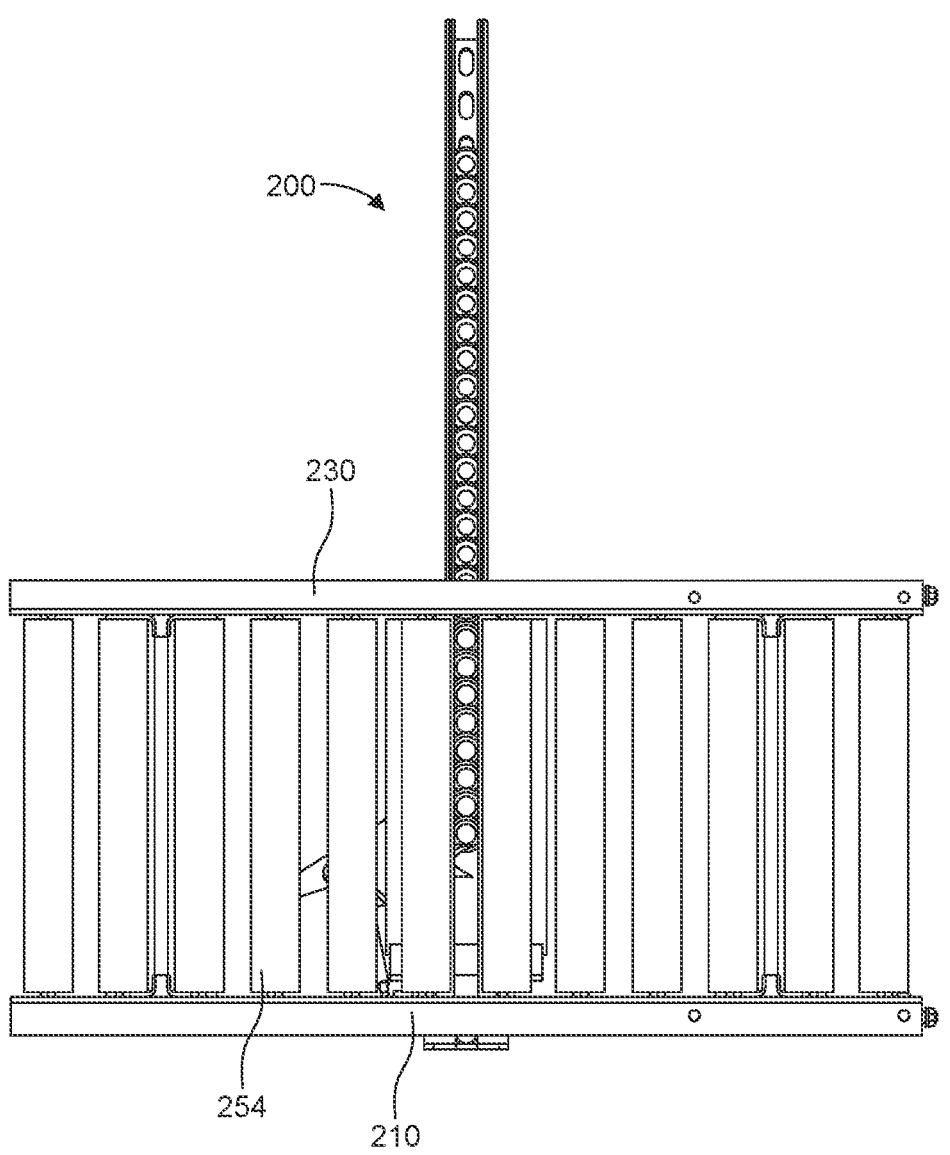
Figure 9:
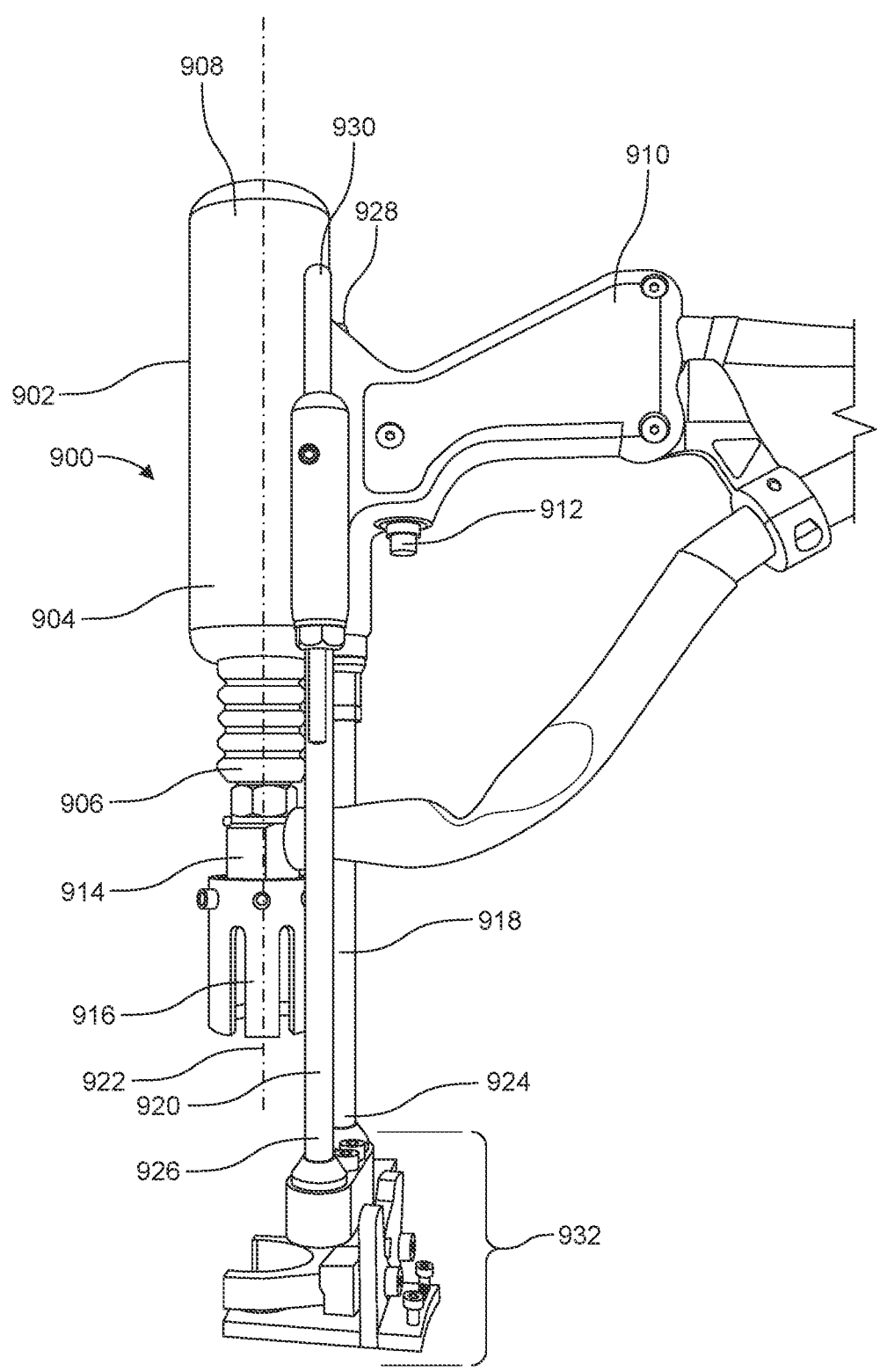
Figure 10:
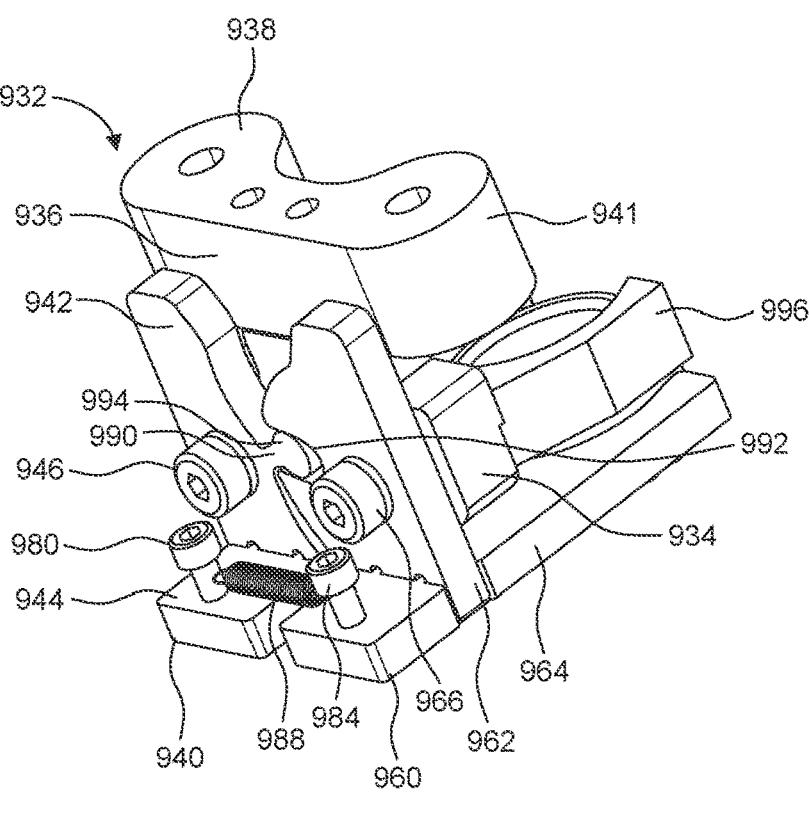
Figure 11:
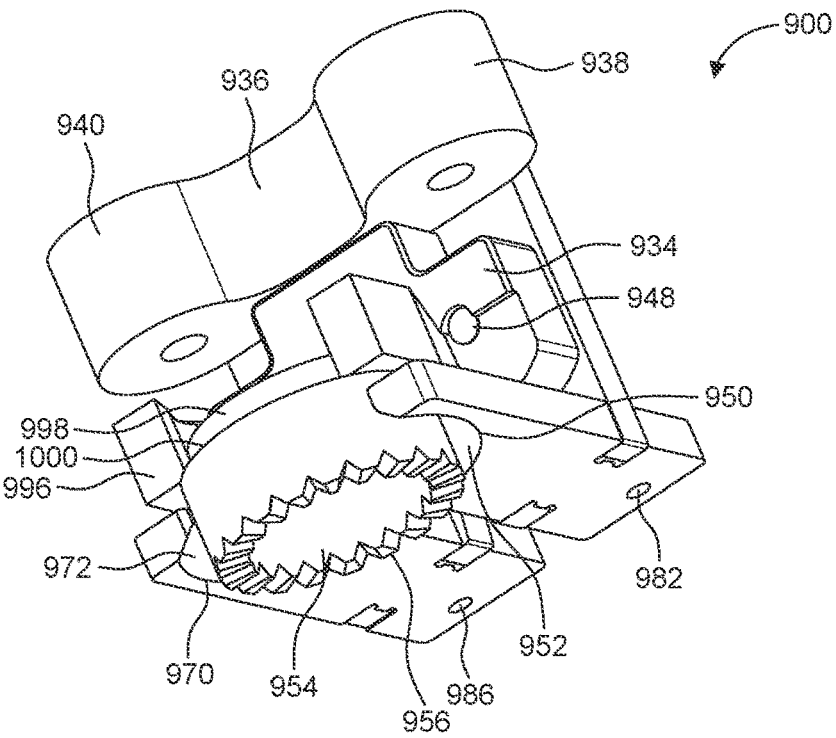
Figure 12:
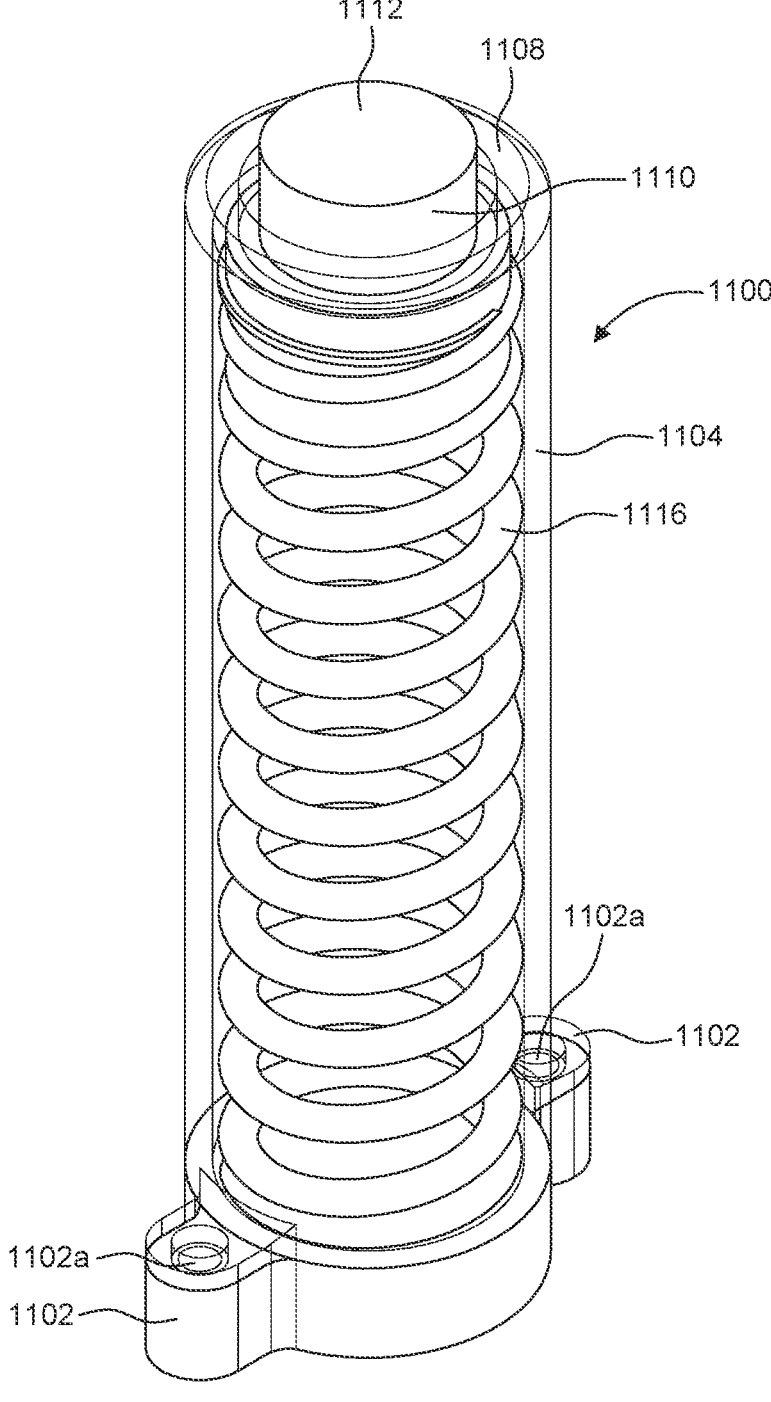
Figure 12A:
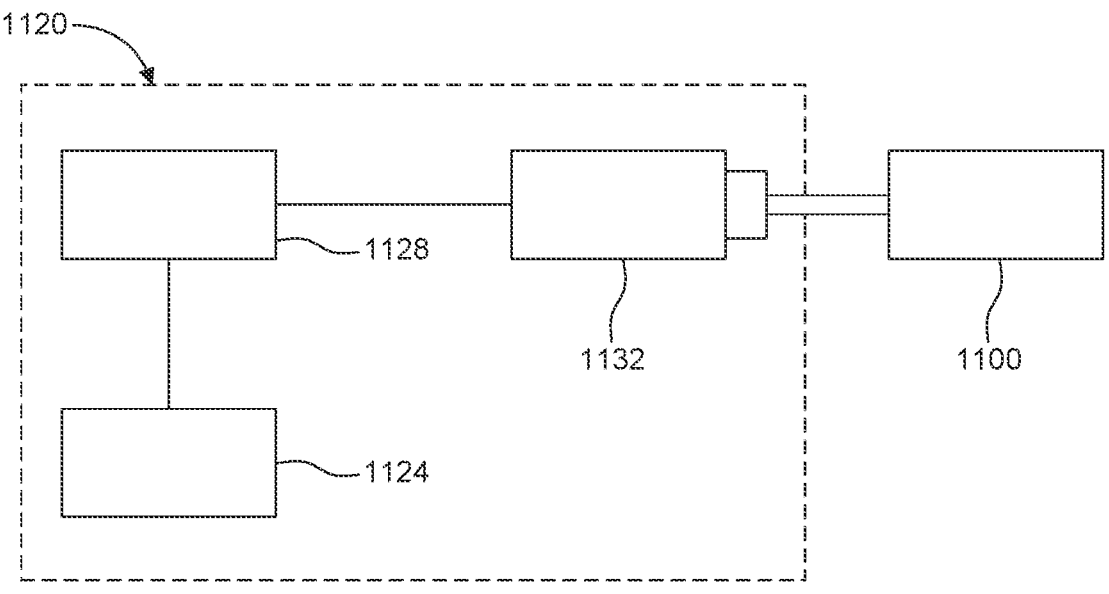
Figure 13:
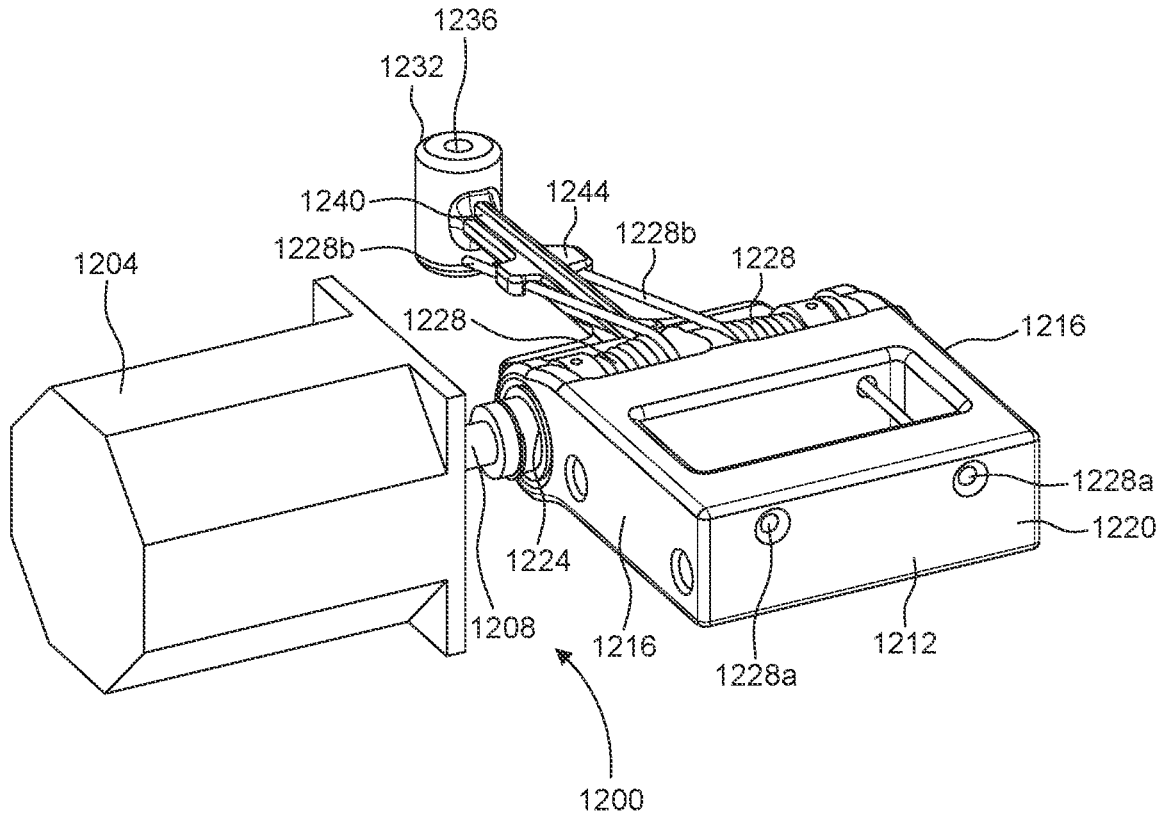

FIG. 8 is a bottom elevation view of a shear stud feeder according to an embodiment;

FIG. 9 is a perspective view of a shear stud welding gun according to an embodiment;

FIG. 10 is a first perspective view of a foot assembly with a ferrule holder according to an embodiment;

FIG. 11 is a second perspective view of a foot assembly with a ferrule holder according to an embodiment;

FIG. 12 is a perspective view of a hammer assembly according to an embodiment;

FIG. 12A is a block diagram illustrating a motor assembly connected to a hammer assembly according to an embodiment; and, FIG. 13 is a perspective view of an alternative hammer assembly according to an embodiment

DETAILED DESCRIPTION

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment but should not be interpreted to preclude the presence or addition of additional features, components, operations, and/or groups thereof.

The following disclosure is intended to be read in connection with the accompanying drawings, which are to be considered part of the entire written description of the invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Figure 1:
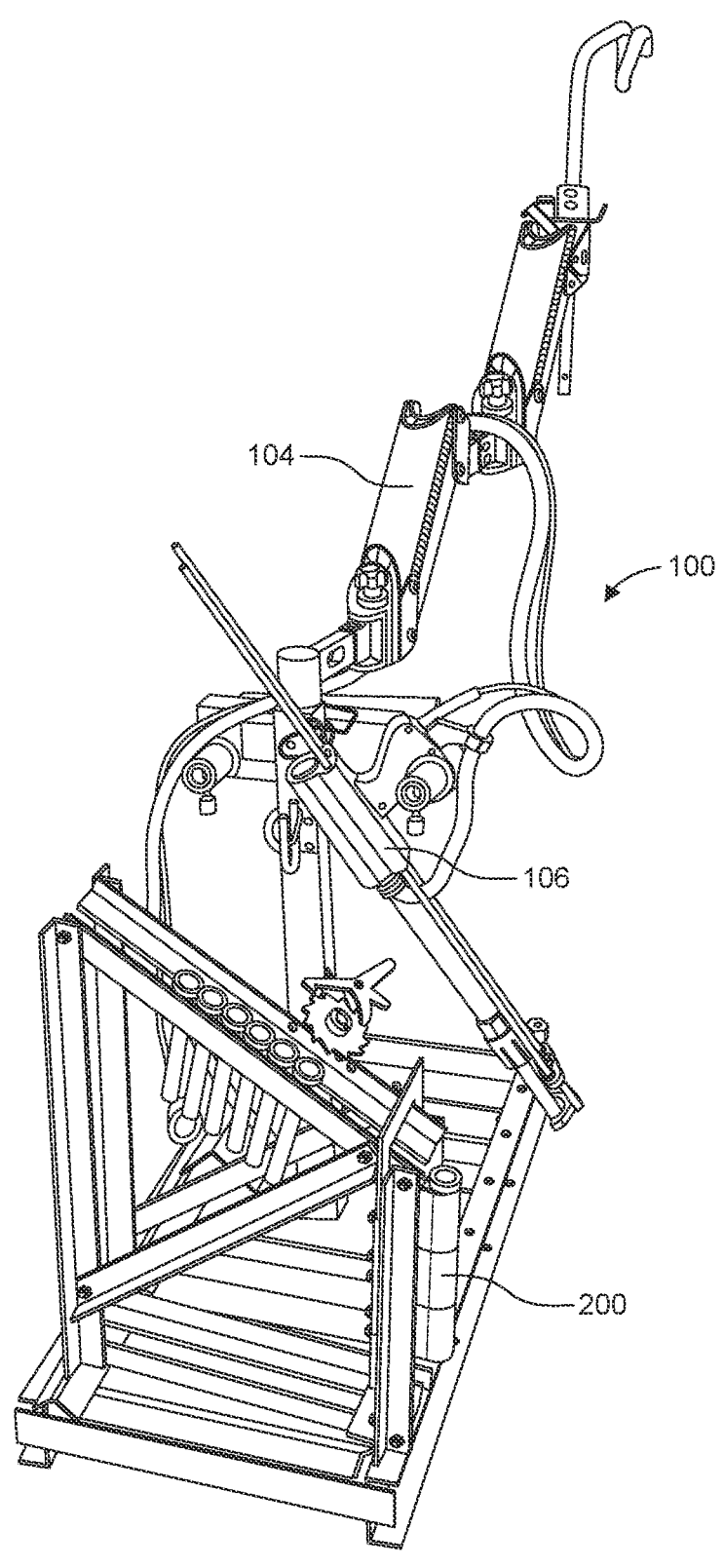
FIG. 1 is a perspective view of a shear stud welding system according to an embodiment.
Figure 2:
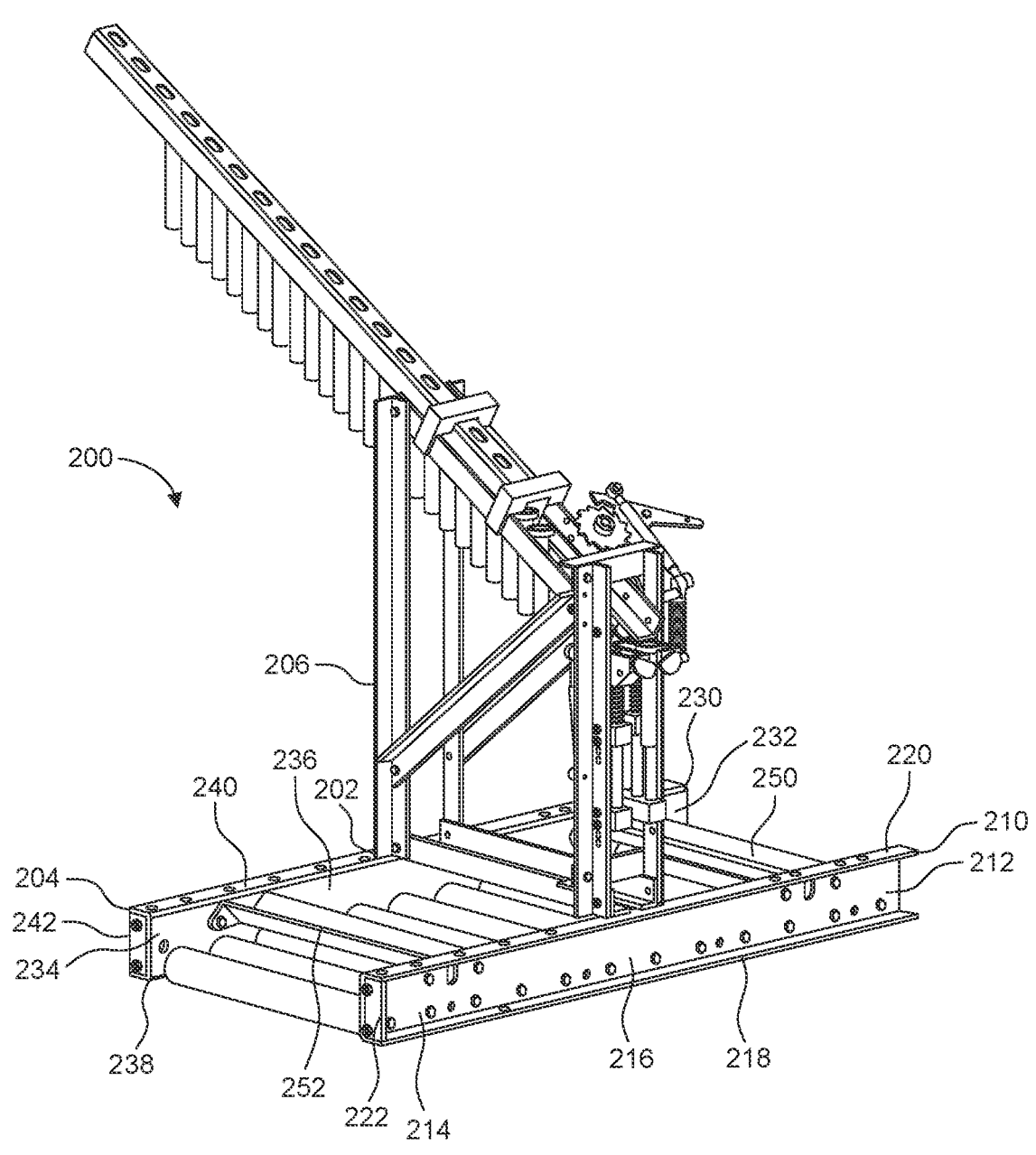
FIG. 2 is a perspective view of a shear stud feeder according to an embodiment.

Referring initially to FIG. 1, a shear stud welding system is shown and is generally designated 100. As shown, the shear stud welding system 100 may include a shear stud feeder 200, a shear stud welding gun support arm 104, and a shear stud welding gun 106. During use, and as explained in greater detail below, a worker can use the shear stud welding gun 106 to retrieve shear studs, one at a time, from the shear stud feeder 200 and weld each shear stud to a steel plate, e.g., the upper flange of a steel I-beam. The shear stud welding gun support arm 104 may support the weight of a heavy electrical cord that may be connected to the shear stud welding gun 106 and as such, may help the worker perform the welding task more efficiency with less fatigue.

FIG. 2 through 8 illustrate an exemplary shear stud feeder 200 that may be used in conjunction with the system 100 shown in FIG. 1. As depicted, the shear stud feeder 200 may include a support frame 202 that may include a generally horizontal lower frame 204 and a generally vertical upper frame 206. The lower frame 204 may include a front rail 210 having a first end 212 and a second end 214 opposite the first end 212. The front rail 210 may be a metal channel having a generally C-shape or a generally U-shape and may include a web 216. A lower flange 218 may extend from the web 216 in a direction that may be substantially perpendicular to the web 216. Moreover, an upper flange 220 may extend from the web 216 in in a direction that may be substantially perpendicular to the web 216 and substantially parallel to the lower flange 218. The front rail 210 may include an end cap 222 that may be disposed in the second end 214 of the front rail 210.

The lower frame 204 may also include a rear rail 230 that may be spaced apart from the front rail 210 and may be substantially parallel to the front rail 210. The rear rail 230 may have a first end 232 and a second end 234 opposite the first end 232. Like the front rail 210, the rear rail 230 may be a steel channel having a generally C-shape or a generally U-shape and may include a web 236. A lower flange 238 may extend from the web 236 in a direction that may be substantially perpendicular to the web 236. Moreover, an upper flange 240 may extend from the web 236 in in a direction that may be substantially perpendicular to the web 236 and substantially parallel to the lower flange 238. The rear rail 230 may include an end cap 242 that may be disposed in the second end 234 of the rear rail 230.

FIG. 2 through FIG. 8 further show that the lower frame 204 may include a first lower cross-member 250 that may extend between the front rail 210 and the rear rail 230 near the first end 212, 232 of each rail 210, 230. The first lower cross-member 250 may be perpendicular to the rails 210, 230. A second lower cross-member 252 may also extend between the front rail 210 and the rear rail 230 near the second end 214, 234 of each rail 210, 230. The second lower cross-member 252 may be substantially parallel to the first lower cross-member 250 and perpendicular to the rails 210, 230. As further shown, the shear stud feeder 200 may include a plurality of substantially identical rollers 254. As best shown in FIG. 2 through FIG. 6, the rollers 254 may be installed between the front rail 210 and the rear rail 230 near the bottom of the shear stud feeder 200 such that a portion of the rollers 254 extend below the lower flanges 218, 238 of the rails 210, 230. Further, the rollers 254 may be coplanar with each other, i.e., a longitudinal axis passing through the center of each roller 254 may lie along the same plane.

As best illustrated in FIG. 3 through FIG. 6, the upper frame 206 of the shear stud feeder 200 may include a first front leg 300 having a lower end 302 and an upper end 304.

Further, the upper frame 206 of the shear stud feeder 200 may include a second front leg 310 having a lower end 312 and an upper end 314. The second front leg 310 may be spaced apart from the first front leg 300 and the second front leg 310 may be substantially parallel to the first front leg 300. The upper frame 206 of the shear stud feeder 200 may also include a first rear leg 320 having a lower end 322 and an upper end 324. Moreover, the upper frame 206 of the shear stud feeder 200 may include a second rear leg 330 having a lower end 332 and an upper end 334. The second rear leg 330 may be spaced apart from the first rear leg 320 and the second rear leg 330 may be substantially parallel to the first rear leg 320, the first front leg 300, and the second front leg 310. Each of the legs 300, 310, 320, 330 may be substantially perpendicular to the lower frame 204 and the rails 210, 230 of the lower frame 204.

Figure 6:
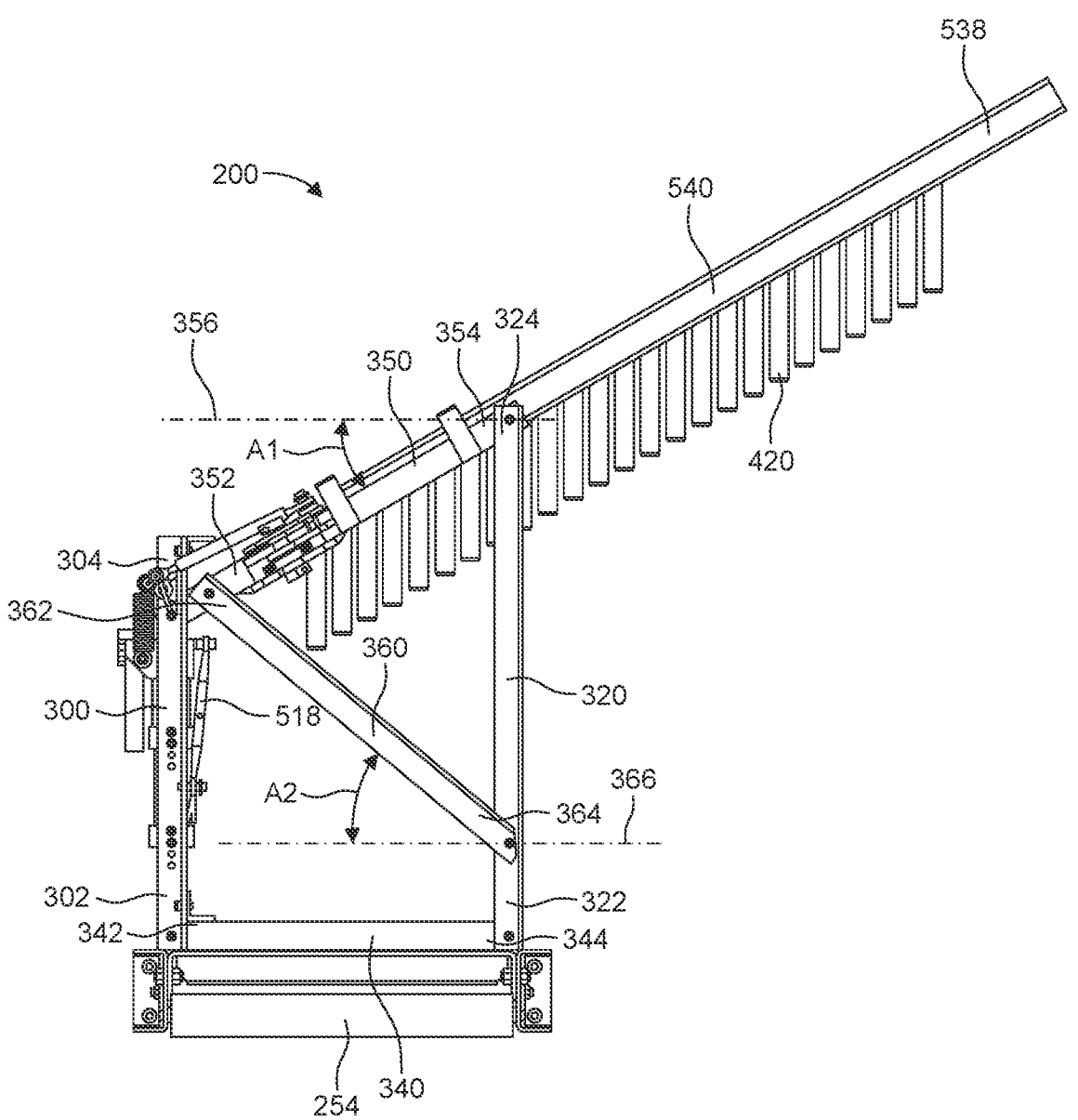
FIG. 6 is a second side elevation view of a shear stud feeder according to an embodiment.

FIG. 6 shows that the shear stud feeder 200 may further include a first lower side brace 340 that may include a front end 342 and a rear end 344. The front end 342 of the first lower side brace 340 may be connected, or otherwise coupled, to the lower end 302 of the first front leg 300. The rear end 344 of the first lower side brace 340 may be connected, or otherwise coupled, to the lower end 322 of the first rear leg 320. In a particular aspect, the first lower side brace 340 may be substantially perpendicular to the first front leg 300 and the first rear leg 320.

As shown, the shear stud feeder 200 may include a first slide rail 350 that may include a front end 352 and a rear end 354. The front end 352 of the first slide rail 350 may be connected, or otherwise coupled, to a location at, or near, the upper end 304 of the first front leg 300. The rear end 354 of the first slide rail 350 may be connected, or otherwise coupled, to the upper end 324 of the first rear leg 320. As shown, the first slide rail 350 may form an angle, A1, with respect to a horizontal axis 356 and A1 may be greater than or equal to 10°, such as greater than or equal to 15°, greater than or equal to 20°, greater than or equal to 25°, or greater than or equal to 30°. In another aspect, A1 may be less than or equal to 45°, such as less than or equal to 40°, or less than or equal to 35°. It is to be understood that A1 may be within a range between, and including, any of the minimum or maximum values of A1 described herein.

In a particular aspect, the first slide rail 350 may include a layer of polymer disposed thereon. The layer of polymer may have a low friction, a high resistance to abrasion, and a high durability. The polymer may be polytetrafluoroethylene (PTFE), polyoxymethylene (POM), ultra-high molecular weight polyethylene (UHMW), high-density polyethylene (HDPE), or a combination thereof. This polymer layer may facilitate shear studs sliding thereon.

FIG. 6 further indicates that the shear stud feeder 200 may include a first middle side brace 360 that may include a front end 362 and a rear end 364. The front end 362 of the first middle side brace 360 may be connected, or otherwise coupled, to a location at, or near, the front end 352 of the first upper brace 350. The rear end 364 of the first middle side brace 360 may be connected, or otherwise coupled, to a location near the lower end 322 of the first rear leg 320. As shown, the first middle side brace 360 may form an angle, A2, with respect to a horizontal axis 366 and A2 may be greater than or equal to 40°, such as greater than or equal to 45°, greater than or equal to 50°, greater than or equal to 55°, or greater than or equal to 60°. In another aspect, A2 may be less than or equal to 75°, such as less than or equal to 70°, or less than or equal to 65°. It is to be understood that A2 may be within a range between, and including, any of the minimum or maximum values of A2 described herein.

Figure 5:
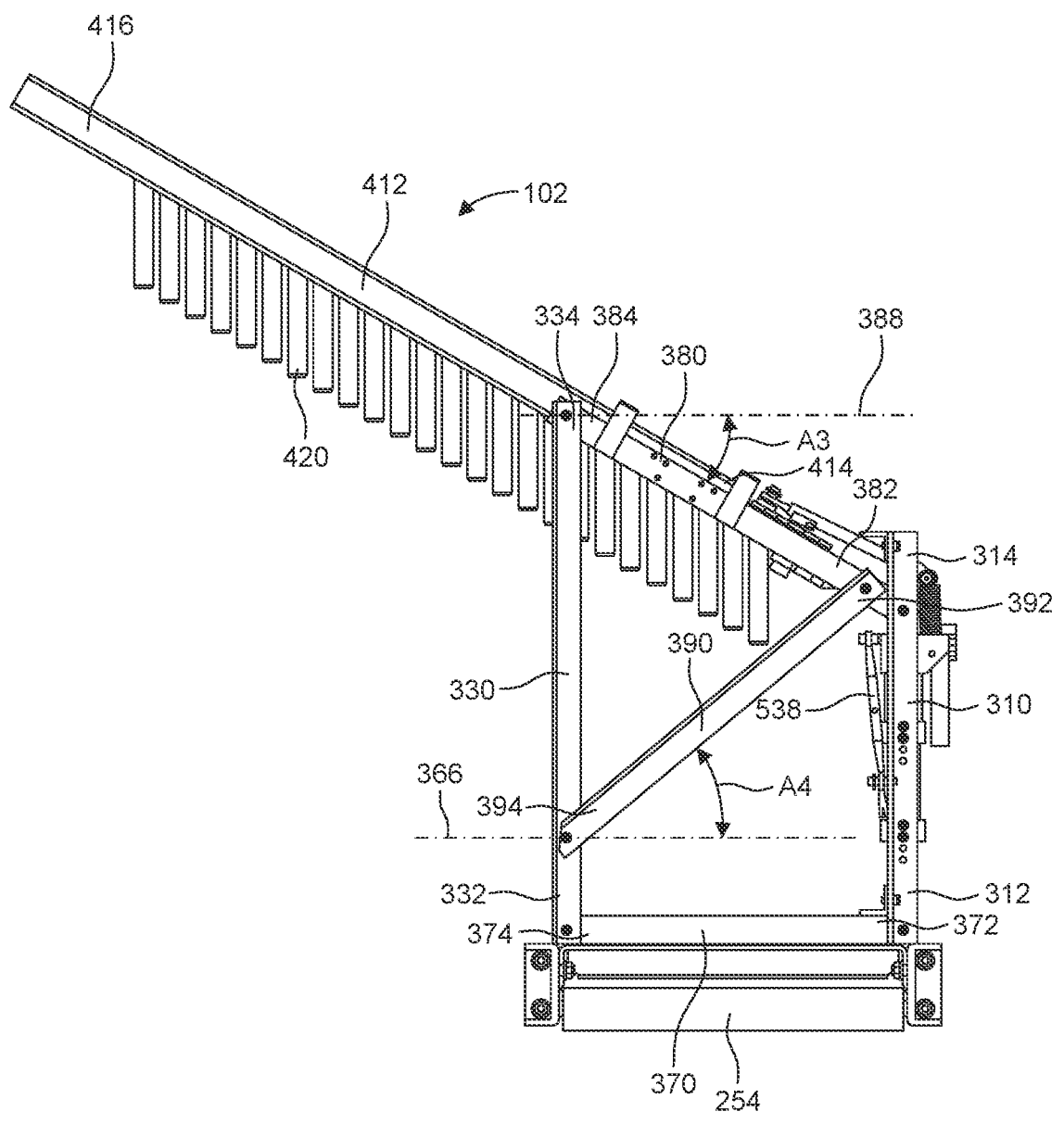
FIG. 5 is a first side elevation view of a shear stud feeder according to an embodiment.

Referring now to FIG. 5, that the shear stud feeder 200 may further include a second lower side brace 370 that may include a front end 372 and a rear end 374. The front end 372 of the second lower side brace 370 may be connected, or otherwise coupled, to the lower end 312 of the second front leg 310. The rear end 374 of the second lower side brace 370 may be connected, or otherwise coupled, to the lower end 332 of the second rear leg 330. In a particular aspect, the second lower side brace 370 may be substantially perpendicular to the second front leg 310 and the second rear leg 330.

Figure 7:
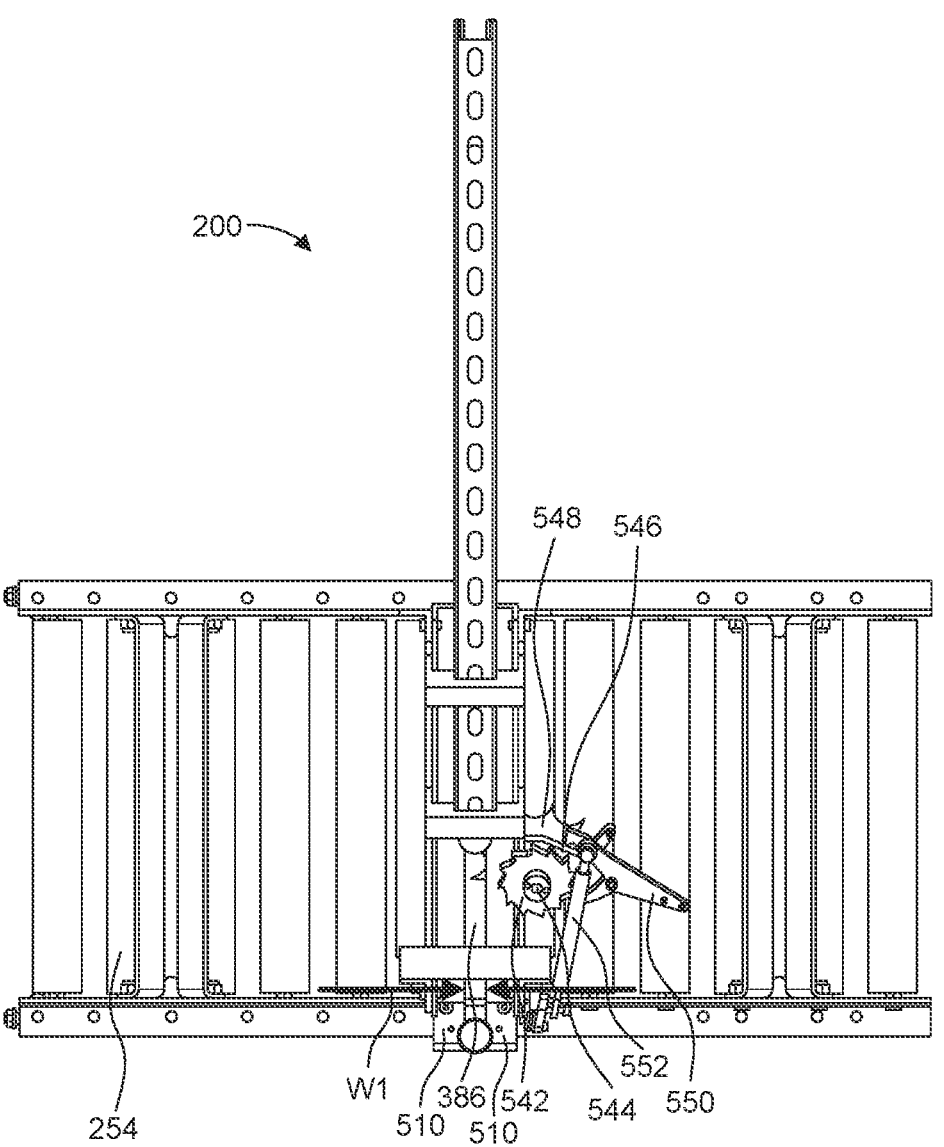
FIG. 7 is a top elevation view detailed view of a shear stud feeder according to an embodiment.

As shown, the shear stud feeder 200 may include a second slide rail 380 that may include a front end 382 and a rear end 384. The front end 382 of the second slide rail 380 may be connected, or otherwise coupled, to a location at, or near, the upper end 314 of the second front leg 310. The rear end 384 of the second slide rail 380 may be connected, or otherwise coupled, to the upper end 334 of the second rear leg 330. As depicted in FIG. 7, the second slide rail 380 may be spaced apart from the first slide rail 350 by a width, W1, to form a slot 386, or channel, between the slide rails 350, 380 along the lengths of the slide rails 350, 380. In a particular aspect, W1 is slightly greater than the diameter, d, of the body of a shear stud. In particular, W1 may be greater than or equal to $1.01*d$, such as greater than or equal to $1.02*d$, greater than or equal to $1.03*d$, greater than or equal to $1.04*d$, or greater than or equal to $1.05*d$. In another aspect, W1 may be less than or equal to $1.10*d$, such as less than or equal to $1.09*d$, less than or equal to $1.08*d$, less than or equal to $1.07*d$, or less than or equal to $1.06*d$. It is to be understood that W1 may be within a range between, and including, any of the minimum and maximum values of W1 described herein.

As shown, the second slide rail 380 may form an angle, A3, with respect to a horizontal axis 388 and A3 may be greater than or equal to 10°, such as greater than or equal to 15°, greater than or equal to 20°, greater than or equal to 25°, or greater than or equal to 30°. In another aspect, A3 may be less than or equal to 45°, such as less than or equal to 40°, or less than or equal to 35°. It is to be understood that A3 may be within a range between, and including, any of the minimum or maximum values of A3 described herein.

In a particular aspect, the second slide rail 380 may include a layer of polymer disposed thereon. The layer of polymer may have a low friction, a high resistance to abrasion, and a high durability. The polymer may be polytetrafluoroethylene (PTFE), polyoxymethylene (POM), ultra-high molecular weight polyethylene (UHMVV), high-density polyethylene (HDPE), or a combination thereof. This polymer layer may facilitate shear studs sliding thereon.

FIG. 5 shows that the shear stud feeder 200 may also include a second middle side brace 390 that may include a front end 392 and a rear end 394. The front end 392 of the second middle side brace 390 may be connected, or otherwise coupled, to a location at, or near, the front end 382 of the second upper brace 380. The rear end 394 of the second middle side brace 390 may be connected, or otherwise coupled, to a location near the lower end 332 of the second rear leg 330. As shown, the second middle side brace 390 may form an angle, A4, with respect to a horizontal axis 366 and A4 may be greater than or equal to 40°, such as greater than or equal to 45°, greater than or equal to 50°, greater than or equal to 55°, or greater than or equal to 60°. In another aspect, A4 may be less than or equal to 75°, such as less than or equal to 70°, or less than or equal to 65°. It is to be understood that A4 may be within a range between, and including, any of the minimum or maximum values of A4 described herein.

Figure 3:
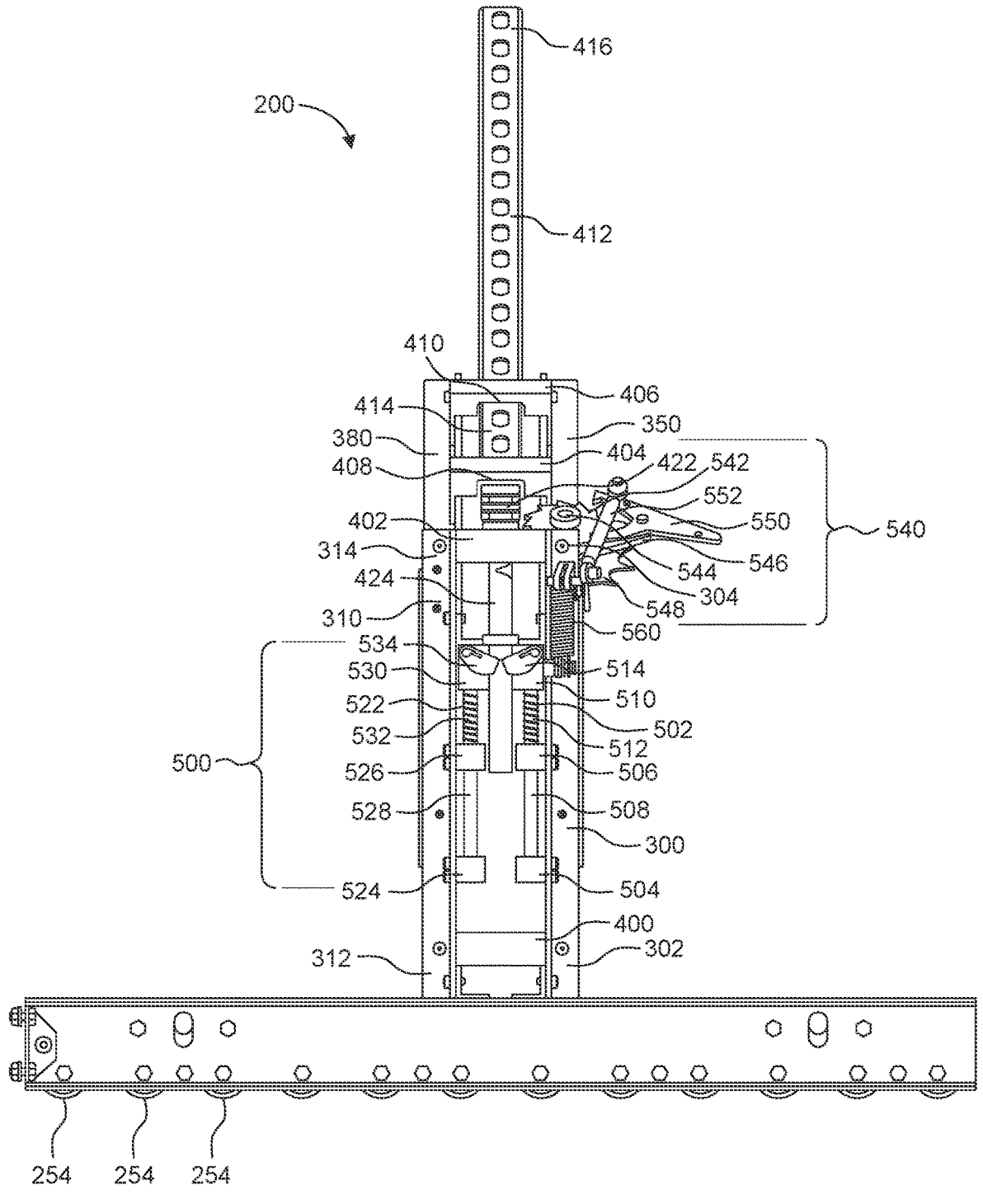
FIG. 3 is a front elevation view of a shear stud feeder according to an embodiment.

FIG. 3 shows that the shear stud feeder 200 may include a lower front cross member 400 that may extend between the lower end 302 of the first front leg 300 and the lower end 312 of the second front leg 310. The shear stud feeder 200 may include an upper front cross member 402 that may extend between the upper end 304 of the first front leg 300 and the upper end 314 of the second front leg 310. Moreover, the shear stud feeder 200 may include a lower magazine holder 404 that may extend between the first slide rail 350 and the second slide rail 380, e.g., near a midpoint of each slide rail 350, 380. The shear stud feeder 200 may also include an upper magazine holder 406 that may extend between the first slide rail 350 and the second slide rail 380, e.g., near the rear end 354, 384 of each respective slide rail 350, 380. Each magazine holder 404, 406 may act as a brace to maintain the spacing between the slide rails 350, 380. Further, each magazine holder 404, 406 may be formed with a cutout 408, 410 that is sized and shaped to receive a magazine 412 therethrough.

The magazine 412 may include a front end 414 and a rear end 416. The magazine 412 may fit into the magazine holders 404, 406 so that the magazine 412 at least partially overlaps the slide rails 350, 380. The magazine 412 may include a plurality of shear studs 420 suspended therein by the head 422 of each shear stud 420, so that the body 424 of each shear stud 420 hangs below the bottom of the magazine 412. The plurality of shear studs 420 may be provided for loading in the magazine as a group of individual shear studs 420 that are unconnected from one another. In a particular aspect, the magazine 412 may include a pin (not shown) near the front end 414 of the magazine 412 and a pin (not shown) near the rear end 416 of the magazine 412. Before the magazine 412 is engaged with the shear stud feeder 200, e.g., the magazine holders 404, 406, the pins can keep the shear studs 420 from sliding out of the magazine 412. After the magazine 412 is engaged with the shear stud feeder 200, the pins can be removed to allow the shear studs 420 to slide from the magazine 412, as described in greater detail below. The magazine 412 may be held at the same angle as the angles, A1 and A3 of the slide rails 350, 380. Retaining the magazine 412 at such a sufficient angle and optionally applying a layer of a suitable polymer to the inside surface of the magazine will facilitate sliding of the shear studs 420 out of the magazine 412 when desired.

Referring now to FIG. 3, the shear stud feeder 200 may include a gate assembly 500 that may be placed adjacent to the front ends 352, 382 of the slide rails 350, 380. The gate assembly 500 may include a first gate sub-assembly 502 and the first gate sub-assembly 502 may include a first lower guide block 504 and a first upper guide block 506. A first vertical gate shaft 508 may extend through the first upper guide block 506 and into the first lower guide block 504. A first landing plate 510 may be disposed at the top of the first vertical gate shaft 508. Moreover, a first spring 512 may be installed around the first vertical gate shaft 508 between the first landing plate 510 and the first upper guide block 506. A first gate 514 may be rotatably disposed on a first horizontal gate shaft 516, see FIG. 4, that extends through the first landing plate 510.

As best shown in FIG. 6, a first trigger arm 518 may be connected to the first horizontal gate shaft 516 opposite the first gate 514 in an off-axis position, so when the first landing plate 510 is moved downward, as described in greater detail below, the trigger arm 518 may rotate, or otherwise bias, the first gate 514 from the closed position, shown in FIG. 3, downward to an open position. In the closed position, a shear stud 420 may be held in place within the gate assembly 500 at the front of the shear stud feeder 200 for retrieval by a stud welding gun, e.g., the collet of the stud welding gun.

In a particular aspect, the upper surface of the first landing plate 510 may include a layer of polymer disposed thereon. The layer of polymer may have a low friction, a high resistance to abrasion, and a high durability. The polymer may be polytetrafluoroethylene (PTFE), polyoxymethylene (POM), ultra-high molecular weight polyethylene (UHMVV), or a combination thereof. Further, the first landing plate 510 may be slightly angled downward from the back to the front, so the upper surface of the first landing plate 510 forms an angle, A5, with respect to a horizontal axis (not show). In a particular aspect, A5 may be greater than or equal to 0.50°, such as greater than or equal to 0.10°, greater than or equal to 0.15°, greater than or equal to 0.20°, greater than or equal to 0.25°, or greater than or equal to 0.30°. In another aspect, A5 may be less than or equal to 5.00°, such as less than or equal to 4.00°, less than or equal to 3.00°, less than or equal to 2.00°, or less than or equal to 1.00°. It is to be understood that A5 may be withing a range between, and including, any of the minimum and maximum values of A5 described herein.

As further shown, the gate assembly 500 of the shear stud feeder 200 may include a second gate sub-assembly 522 and the second gate sub-assembly 522 may include a second lower guide block 524 and a second upper guide block 526. A second vertical gate shaft 528 may extend through the second upper guide block 526 and into the second lower guide block 524. A second landing plate 530 may be disposed at the top of the second vertical gate shaft 528.

Figure 4:
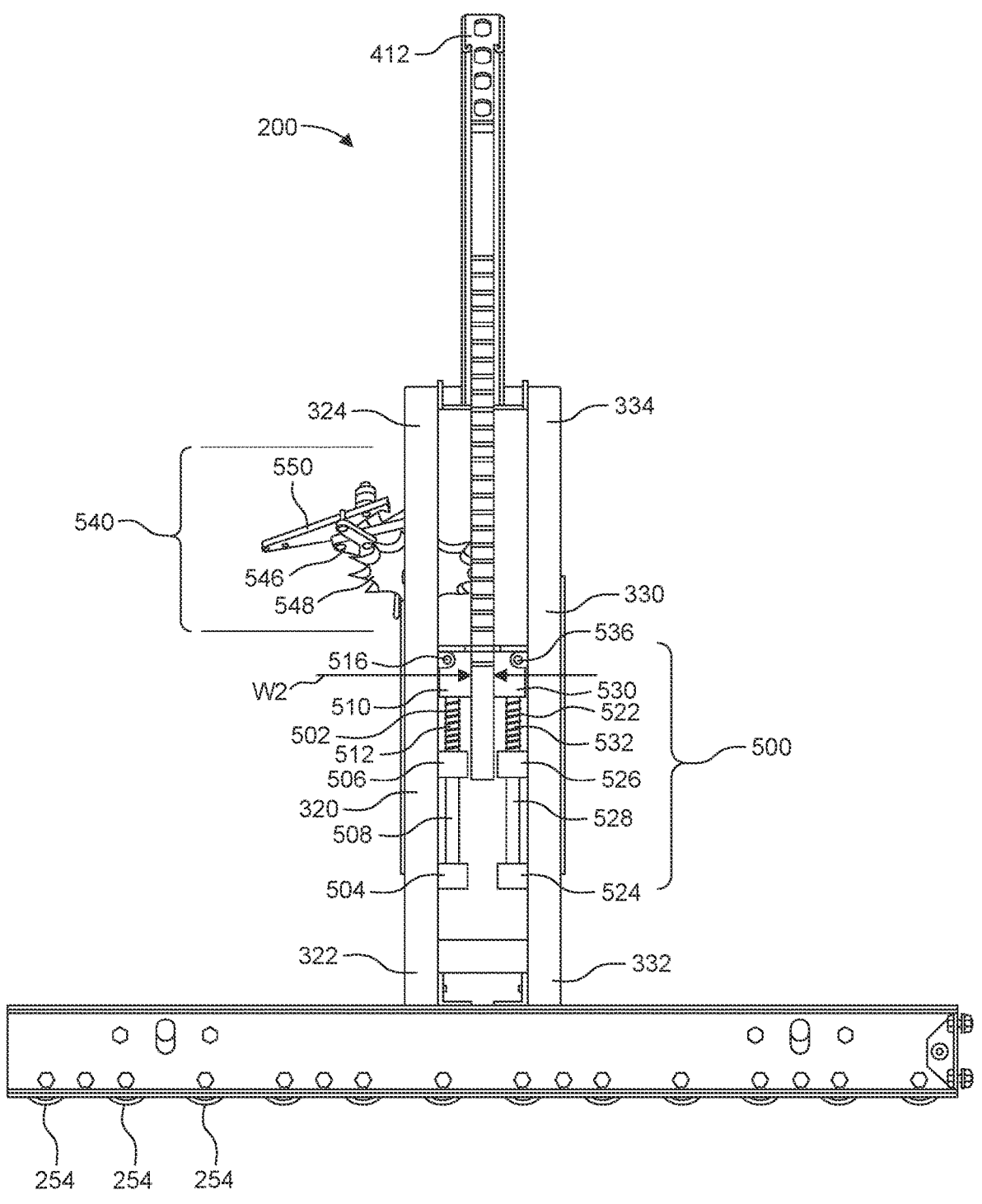
FIG. 4 is a rear elevation view of a shear stud feeder according to an embodiment.

As depicted in FIG. 4, the second landing plate 530 may be spaced apart from the first landing plate 510 by a width, W2. In a particular aspect, W2 is slightly greater than the diameter, d, of the body of a shear stud. Further, W2 may be same as W1, described above. In particular, W2 may be greater than or equal to 1.01*d, such as greater than or equal to 1.02*d, greater than or equal to 1.03*d, greater than or equal to 1.04*d, or greater than or equal to 1.05*d. In another aspect, W2 may be less than or equal to 1.10*d, such as less than or equal to 1.09*d, less than or equal to 1.08*d, less than or equal to 1.07*d, or less than or equal to 1.06*d. It is to be understood that W2 may be within a range between, and including, any of the minimum and maximum values of W2 described herein.

A second spring 532 may be installed around the second vertical gate shaft 528 between the second landing plate 530 and the second upper guide block 526. A second gate 534 may be rotatably disposed on a second horizontal gate shaft 536, see FIG. 4, that extends through the second landing plate 530. As best shown in FIG. 5, a second trigger arm 538 may be connected to the second horizontal gate shaft 536 opposite the second gate 534 in an off-axis position, so when the second landing plate 530 is moved downward, as described in greater detail below, the trigger arm 538 may rotate, or otherwise bias, the second gate 534 from the closed position, shown in FIG. 3, downward to an open position. In the closed position, a shear stud 420 may be held in place within the gate assembly 500 at the front of the shear stud feeder 200 for retrieval by a stud welding gun, e.g., the collet of the stud welding gun.

In a particular aspect, the upper surface of the second landing plate 530 may include a layer of polymer disposed thereon. The layer of polymer may have a low friction, a high resistance to abrasion, and a high durability. The polymer may be polytetrafluoroethylene (PTFE), polyoxymethylene (POM), ultra-high molecular weight polyethylene (UHMVV), or a combination thereof. Further, the second landing plate 530 may be slightly angled downward from the front to back, so the upper surface of the second landing plate 530 forms an angle, A5, with respect to a horizontal axis (not show). In a particular aspect, A5 may be greater than or equal to 0.50°, such as greater than or equal to 0.10°, greater than or equal to 0.15°, greater than or equal to 0.20°, greater than or equal to 0.25°, or greater than or equal to 0.30°. In another aspect, A5 may be less than or equal to 5.00°, such as less than or equal to 4.00°, less than or equal to 3.00°, less than or equal to 2.00°, or less than or equal to 1.00°. It is to be understood that A5 may be withing a range between, and including, any of the minimum and maximum values of A5 described herein. It is also to be understood that the first and second gate sub-assemblies 502, 522 are substantially mirror opposites of each other.

As depicted in FIGS. 3 and 7, the shear stud feeder 200 may further include a feed mechanism 540 that may be placed adjacent to the first slide rail 350. In particular, the feed mechanism may be placed to the side of the first slide rail 350 near the front end 352 of the first slide rail 350. As shown, the feed mechanism 540 may include a trigger wheel 542. The trigger wheel 542 may be mounted on an upper end of a shaft 544 that may spin in a support plate 546 that may extend from the first side rail 350. A stud sprocket 548 may be mounted on the lower end of the shaft 544 below the support plate 546. The stud sprocket 548 may include a plurality of sprocket teeth around the outer periphery of the stud sprocket 548. The shear studs 420 may fit, one at a time, between adjacent sprocket teeth of the stud sprocket 548 as the stud sprocket 548 rotates, as described below, to feed the shear studs, one at a time, to the gate assembly 500 from the magazine 412 and the slot formed between the slide rails 350, 380.

A rocker arm 550 may be mounted on the support plate 546 adjacent to, and at least partially around, the perimeter of the trigger wheel 542. A trigger arm 552 may extend from the rocker arm toward the front of the shear stud feeder 200. The trigger arm 552 may be connected to the first upper landing plate 510 via an extension spring 560.

During operation, a worker may place the collet of a shear stud welding gun over the head 422 of the shear stud 420 that is hanging in the gate assembly 500, e.g., between the landing plates 510, 530. Using the welding gun, the worker may push the landing plates 510, 530 in a downward direction. This may open the gates 514, 534 and may force the head 422 of the shear stud 420 into the collet of the welding gun. At the same time, as the landing plates 510, 530 move in a downward direction, the first landing plate 510 may pull the extension spring 560 in a downward direction. The extension spring 560 may cause the trigger arm 552 of the feed mechanism 540 to move forward and rock the rocker arm 550 of the feed mechanism 540 on the support plate 546. This will partially rotate, or advance, the trigger wheel 542 of the feed mechanism 540 a half-step in a counter-clockwise direction. As the trigger wheel 542 rotates a half-step in the counter-clockwise direction, the stud sprocket 548 may also rotates a half-step in the counter-clockwise direction.

As the worker removes the shear stud 420 from the open gate assembly, the downward force may be removed from the landing plates 510, 530 and the springs 512, 532 within each gate sub-assembly 502, 522 may bias, or return, the landing plates 510, 530 to the starting position. At the same time, the upward movement of the landing plates 510, 530 may cause the gates 514, 534 to close. The upward movement of the first landing plate 514 may also release the tension on the extension spring 560 which may cause the rocker arm 550 of the feed mechanism 540 to return to the starting position of the rocker arm 550. The movement of the rocker arm 550 back to the starting position may further rotate, or advance, the trigger wheel 542 of the feed mechanism 540 another half-step in the counter-clockwise direction. Again, as the trigger wheel 542 rotates another half-step in the counter-clockwise direction, the stud sprocket 548 may also rotate another half-step in the counter-clockwise direction. This may cause the stud sprocket 548 to release a shear stud 420 that was captured between two adjacent sprocket teeth on the stud sprocket 548. The released shear stud 420 may travel, or slide, down the slide rails 350, 380 and into the gate assembly 500 where it may be prevented from sliding out of the gate assembly 500 by the gates 514, 534. As a shear stud 420 is released, the stud sprocket 548 may capture another shear stud between another pair of adjacent sprocket teeth where it may be held until released, as described above.

With the configuration of structure described herein, the shear stud feeder 200 may continuously provide shear studs 420 to a shear stud welding gun—as long as there are shear studs 420 placed in the magazine 412. The shear studs 420 may be fed into the magazine 412 one at a time or an entire magazine 412 of shear studs 420 may be loaded into the shear stud feeder 200. The shear stud feeder 200 eliminates the need for the worker to manually load each shear stud 420 into the shear stud welding gun. In another aspect, the shear stud feeder 200 may be fitted with a ferrule dispenser (not shown). The ferrule dispenser may be fitted between the lower side braces 340, 370 and may dispense a single ferrule below the gate assembly 500, e.g., below the shear stud 240 within the gate assembly 500. As a worker retrieves the shear stud 420 with the collet of the shear stud welding gun and extension on the collet having two arms may be configured to fit around and grab the ferrule at the same time as the shear stud 420 is retrieved from the gate assembly 500.

Referring now to FIG. 9, a shear stud welding gun is illustrated and is generally designated 900. The shear stud welding gun 900 may include a body 902. The body 902 may include a barrel 904 that may include a lower end 906 and an upper end 908. A handle 910 may extend from the barrel 904 near the upper end 908 of the barrel 904. The handle 910 may include a button 912 that an operator may press, or otherwise toggle, to initiate an arc to perform a welding operation using the shear stud welding gun 900.

A collet 914 may extend from the lower end 906 of the barrel 904 of the shear stud welding gun 900 and a spark shield 916 may at least partially circumscribe, or surround, a portion of the collet 914, e.g., the end of the collet 914 that is configured to receive and engage the head of a shear stud (not shown in FIG. 9). When fully engaged, the shear stud 420 intrudes approximately ¼" into the end of the collet 914, which is approximately the thickness of the head of the shear stud 420. FIG. 9 further indicates that the shear stud welding gun 900 may include a first leg 918 and a second leg 920. The legs 918, 920 may extend at least partially along the length of the barrel 904 of the body 902 of the shear stud welding gun 900. Moreover, the legs 918, 920 may flank the barrel 904 and the legs 918, 920 may be parallel to each other and to a longitudinal axis 922 of the barrel 904. Each leg 918, 920 may include a lower end 924, 926 and an upper end 928, 930. A foot assembly 932 may be engaged with the lower ends 924, 926 of the legs 918, 920.

FIG. 10 and FIG. 11 illustrate the details of the foot assembly 932. As shown, the foot assembly 932 may include a support plate 934 and a collar assembly 936 may be engaged with, or otherwise attached to, the support plate 934, e.g., at the top of the support plate 934. The collar assembly 936 may include a first collar 938 and a second collar 941. The collars 938, 941 may be configured to engage the lower ends 924, 926 of the legs 918, 920 of the shear stud welding gun 900, e.g., in a press fit arrangement. Otherwise, the collars 938, 940 may be threadably engaged with the lower ends 924, 926 of the legs 918, 920.

As further shown in FIG. 10 and FIG. 11, the foot assembly 932 may include a first generally L-shaped ferrule engagement bracket 940 rotatably connected to the support plate 934. In particular, the first ferrule engagement bracket 940 may include a first mounting plate 942. Further, a first foot plate 944 may extend from the first mounting plate 942 and may be substantially perpendicular with the first mounting plate 942. A first socket head screw 946 may extend through the mounting plate 942 of the first ferrule engagement bracket 940 and may threadably engage a first threaded hole 948 in the support plate 934. In a particular aspect, the first foot plate 944 may be formed with a first cut out 950 formed with a generally curved surface 952 that may flare radially outward from near the top of the first foot plate 944 to the bottom of the first foot plate 944. The first cut out 950 may be configured to fit at least partially around the body 954 of a ferrule 956.

As shown, the foot assembly 932 may include a second generally L-shaped ferrule engagement bracket 960 rotatably connected to the support plate 934. In particular, the second ferrule engagement bracket 960 may include a second mounting plate 962. Further, a second foot plate 964 may extend from the second mounting plate 962 and may be substantially perpendicular with the second mounting plate 962. A second socket head screw 966 may extend through the mounting plate 962 of the second ferrule engagement bracket 960 and may threadably engage a second threaded hole (not shown) in the support plate 934. In a particular aspect, the second foot plate 964 may be formed with a second cut out 970 formed with a generally curved surface 972 that may flare radially outward from near the top of the second foot plate 964 to the bottom of the second foot plate 964. The second cut out 970 may be configured to fit at least partially around the body 954 of the ferrule 956.

FIG. 10 and FIG. 11 further show that the first ferrule engagement bracket 940 may include a first spring post 980 threadably engaged with a hole 982 in the first foot plate 944. The second ferrule engagement bracket 960 may include a second spring post 984 threadably engaged with a hole 986 in the first foot plate 964. A spring 988 may be installed in tension between the spring posts 980, 984.

As illustrated in FIG. 10, the first mounting plate 942 of the first ferrule engagement bracket 940 may include a rocker arm 990 that may extend from an inner sidewall of the first mounting plate 942. The second mounting plate 962 of the second ferrule engagement bracket 960 may include a cutout 992 that may extend into an inner sidewall of the second mounting plate 962. The cutout 992 formed in the second ferrule engagement bracket 960 may be sized and shaped to fit around the rocker arm 990 formed on the first ferrule engagement bracket 940. Moreover, the first ferrule engagement bracket 940 and the second ferrule engagement bracket 960 may rotate relative to each other about, or around, the center of the rounded head 994 of the rocker arm 990. Accordingly, the rocker arm 990 and the cutout 992 may form a hinge so that the first ferrule engagement bracket 940 is hingedly attached to the second ferrule engagement bracket 960. The spring 988 may bias the hinge formed by the first ferrule engagement bracket 940 and the second ferrule engagement bracket 960 to a closed position.

FIG. 10 and FIG. 11 further indicate that the foot assembly 932 may further include a ferrule stop collar 996 that may extend from the support plate 934 above the foot plates 944, 964 of the ferrule engagement brackets 940, 960. The ferrule stop collar 998 may be substantially parallel to the foot plates 944, 964 of the ferrule engagement brackets 940, 960. The ferrule stop collar 996 may be sized and shaped to allow a recessed hub 998 on top of the ferrule 956 to fit therein. Accordingly, during use and operator may retrieve the ferrule 956 by placing the shear stud welding gun 900 over the ferrule 956 so that the foot assembly 932 is over the ferrule 956. Then, the operator can move the stud welding gun 900 in a downward direction. A shoulder 1000 on the ferrule 956 may cause the ferrule engagement brackets 940, 960 to splay slightly apart, via the hinge formed by the rocker arm 990 and the cutout 992. When the hub 998 on the ferule 956 is fully inserted in the ferrule stop collar 998, the force of the spring 988 will bias the ferrule engagement brackets 940, 960 in an inward direction to hold the ferrule 956 within the grasp of the ferrule holder formed by the ferrule engagement brackets 940, 960 of the foot assembly 932.

Referring now to FIG. 12, a hammer assembly 1100 is provided as an alternative mechanism for loading the shear studs 420 into the collet 914 of the welding gun 900. During use, the hammer assembly 1100 may be positioned at the front of the shear stud feeder 200 directly beneath the bottom end of a shear stud 420 that is hanging in place within the gate assembly 500 (FIGS. 3 through 5). The hammer assembly 1100 may include a generally cylindrically-shaped housing 1104 having a circular aperture 1108 positioned at a top end thereof. The housing 1104 may be provided with standoffs 1102 having openings 1102a therethrough arranged to receive fasteners such as screws (not shown) to enable fastening of the hammer assembly 1100 at a fixed position in front of the shear stud feeder 200. The housing 1104 is arranged to house therein a piston assembly 1110 which may include a disc-shaped piston 1112 and a compression spring 1116 in the form of an open-coil helical spring coiled at a constant diameter. At its lower end, the compression spring 1116 is arranged to engage with the base or bottom of the housing 1104. The piston 1112 is mounted to the upper end of the compression spring 1116. A releasable latch (not shown) is provided to engage with either the compression spring 1116 or the piston 1112 to retain the compression spring 1116 in a compressed state and the piston 1112 at a retracted position. Alternatively, a solenoid device (not shown) including a moveable plunger may be provided for this purpose.

As best illustrated in FIG. 12, upon release of the latch (not shown), the compression spring 1116 is arranged to expand to an uncompressed state and move the piston 1112 a predetermined distance to an extended position. During operation, a worker may place the collet 914 of a shear stud welding gun 106 over the head 422 of a shear stud 420 that is hanging within the gate assembly 500. With the stud welding gun 106 in position, the worker may release the latch causing the compression spring 1116 to drive the piston 1112 upwardly to contact the bottom end of the shear stud 420 and drive the head 422 of the shear stud 420 into the collet 914 of the welding gun 900.

Referring now to FIG. 12A, block diagram of a motor assembly 1120 is shown within broken lines. The motor assembly 1120 may be provided and physically connected to the hammer assembly 1100 to return the piston 1112 to its retracted position once the shear stud 420 has been inserted into the collet 914 of the welding gun 900. In particular, the motor assembly 1120 may include a power source 1124, a motor controller 1128, and a motor 1132. Upon actuation, the motor assembly 1120 may re-engage the latch with the piston 1112 and/or the compression spring 1116, and return the compression spring 1116 to its compressed state and return the piston 1112 to a retracted position.

Referring now to FIG. 13, there is shown a second alternative hammer assembly 1200 for loading shear studs 420 into a collet 914 of a welding gun 900. The hammer assembly 1200 may include a motor 1204. The motor 1204 may include a rotatable output shaft 1208 that extends laterally from the motor and into a rectangular enclosure 1212 located adjacent the motor 1204. The enclosure 1212 includes opposed side walls 1216, and a backwall 1220. Each sidewall 1216 includes an opening 1224 through which the output shaft 1208 may extend. One or more torsion springs 1228, e.g., two torsion springs 1228, may be provided. At a first end 1228a, each torsion spring 1228 is affixed to the backwall 1212 of the enclosure 1212. Each torsion spring 1228 may extend from the first end 1228a across the enclosure 1220 and may wrap over the output shaft 1208 of the motor 1204 to form a helical coil portion in the form of an open coil having a constant diameter. Thereafter, each torsion spring 1228 may extend from the helical coil to a second end 1228b. As shown in FIG. 13, each second end 1228b is attached to one of a pair of notched wings 1244, as discussed in further detail below.

A hammer 1232 includes a head portion 1236 and an arm portion 1240, the arm portion 1240 including a distal end attached to or integral with the head portion 1236, and a proximal end attached to or integral with the enclosure 1220. The hammer 1232 is arranged to move pivotally between a retracted position, as best shown in FIG. 13, and an extended position to make contact with a shear stud 420 hanging within the gate assembly 500. The hammer 1232 may be latched or otherwise retained in the retracted position by any suitable means, e.g., such as by a conventional ratchet assembly (not shown).

A pair of opposed notched wings 1244 are provided along the length of the arm portion 1240. The notched wings 1244 are arranged to receive the second ends 1228b of the torsion spring 1228. Upon engaging the second ends 1228b of the torsion springs 1228 under the notched wings 1224 of the hammer 1232, the torsion springs 1228 are twisted to exert a torque in the opposite direction. Upon release of the latch by a worker, the torsion springs 1228 will release their energy and drive the hammer 1232 from the retracted position to the extended position to contact the bottom end of the shear stud 420 and drive the head 422 of the shear stud 420 into the collet 914 of the welding gun 900. Thereafter, the motor 1204 may be actuated to re-engage the latch with the hammer 1232 and return the hammer 1232 to the retracted position. Further, the motor may be configured to add to the force of the torsion springs upon the release thereby complementing the force exerted on the hammer.

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention, as defined by the following claims.

The invention claimed is:

1. An apparatus comprising:
a support frame having a first slide rail and a second slide rail longitudinally spaced apart from the first slide rail to form a slot therebetween along an entire length of each slide rail;
a feed mechanism disposed adjacent to either the first slide rail or the second slide rail, wherein the feed mechanism is adapted to release the plurality of shear studs from the support frame one at a time; and
a gate assembly adjacent to a front end of each of the first slide rail and the second slide rail, wherein the gate assembly is adapted to capture a shear stud after it is released from the support frame by the feed mechanism;
wherein the support frame is adapted to support a plurality of shear studs by a head of each stud in a manner in which a body of each stud hangs below a bottom of the support frame.

2. The apparatus of claim 1, wherein the gate assembly is adapted to release the shear stud upon application of a downward force to a portion of the gate assembly.

3. The apparatus of claim 2, wherein the gate assembly includes at least one gate that is movable between a closed position in which the shear stud is retained in the gate assembly and an open position in which the shear stud is released from the gate assembly.

4. The apparatus of claim 3, wherein the at least one gate rotates from the closed position to the open position.

5. The apparatus of claim 1, wherein each slide rail includes a layer of polymer disposed thereon.

6. The apparatus of claim 1, wherein the feed mechanism includes a trigger wheel disposed on a shaft.

7. The apparatus of claim 1, additionally comprising a hammer assembly positioned beneath the gate assembly, the hammer assembly including a hammer arranged to move from a retracted position to an extended position to drive the shear stud captured in the gate assembly into a collet of a welding gun.

8. The apparatus of claim 1, wherein the support frame further comprises a magazine adapted to dispense the plurality of shear studs to the slot between the slide rails.

9. The apparatus of claim 8, wherein the magazine is removably engaged with the support frame.

10. The apparatus of claim 1, further comprising a hammer assembly positioned beneath the gate assembly, the hammer assembly having a head that is selectively movable between a retracted position and an extended position, wherein the head is adapted to drive the shear stud captured in the gate assembly into a collet of a welding gun as the head moves from the retracted position to the extended position.

11. A system for feeding shear studs to a welding gun, the system comprising:
a magazine adapted to support a plurality of shear studs by a head of each shear stud, wherein a body of each shear stud hangs below a bottom of the magazine;
an advancing mechanism adapted to advance the plurality of shear studs in succession from the magazine;
a gate adapted to retain therein a shear stud received from the advancing mechanism with the head of the shear stud exposed to a collet of the welding gun, the gate adapted to provide a resistive force in response to actuation by the welding gun to drive the head of the shear stud into the collet of the welding gun; and
a support frame arranged to support the magazine, the advancing mechanism, and the gate.

12. The system of claim 11, wherein the advancing mechanism is adapted to advance the plurality of shear studs from the magazine in individual succession.

13. The system of claim 11, wherein the advancing mechanism further comprises a lever arranged to advance the plurality of shear studs in succession in response to actuation by the welding gun.

14. The system of claim 11, wherein the gate additionally comprises a spring disposed thereon for providing the resistive force.

15. The system of claim 11, wherein the system additionally comprises a hammer assembly arranged to drive the head of the shear stud into the collet of the welding gun in response to actuation.

16. The system of claim 11, additionally comprising a support arm for supporting the welding gun.

17. The system of claim 11, wherein the system additionally comprises a plurality of rollers disposed on the support frame.

* * * * *